July 1, 1958 L. V. GUEST 2,841,399

SOUND REPRODUCING APPARATUS USING DISC RECORDS

Filed June 20, 1955 5 Sheets-Sheet 1

INVENTOR

Laurence V. Guest

BY Ralph B. Stewart

ATTORNEY

July 1, 1958 L. V. GUEST 2,841,399

SOUND REPRODUCING APPARATUS USING DISC RECORDS

Filed June 20, 1955 5 Sheets-Sheet 2

INVENTOR

Lawrence V. Guest

BY

Ralph B. Stewart

ATTORNEY

July 1, 1958 L. V. GUEST 2,841,399

SOUND REPRODUCING APPARATUS USING DISC RECORDS

Filed June 20, 1955 5 Sheets-Sheet 3

INVENTOR
Lawrence V. Guest
BY
Ralph B. Stewart
ATTORNEY

SOUND REPRODUCING APPARATUS USING DISC RECORDS

Filed June 20, 1955 5 Sheets-Sheet 4

INVENTOR
Lawrence V. Guest
BY
Ralph B. Stewart
ATTORNEY

SOUND REPRODUCING APPARATUS USING DISC RECORDS

Filed June 20, 1955 5 Sheets-Sheet 5

INVENTOR
Lawrence V. Guest
BY
Ralph B. Stewart
ATTORNEY

United States Patent Office 2,841,399
Patented July 1, 1958

2,841,399

SOUND REPRODUCING APPARATUS USING DISC RECORDS

Lawrence Vincent Guest, Old Hill, England, assignor to Birmingham Sound Reproducers Limited, Old Hill, England Application June 20, 1955, Serial No. 516,553
6 Claims. (Cl. 274—9)

The present invention relates to improvements in sound reproducing apparatus using disc records.

Various kinds of disc sound records are available today, some of which are required to be rotated during reproduction, at speeds which differ widely from the rotational speeds required by others and in order to enable records of the several kinds to be reproduced with a single reproducing apparatus, it is common to provide the apparatus with turntable driving means capable of rotating the turntable at any selected one of two or more pre-arranged speeds e. g. 78 R. P. M., 45 R. P. M. and 33⅓ R. P. M., appropriate to the kind of disc record intended next to be reproduced.

The dimensions of the record groove differ as between what may be termed "normal" record discs intended to be reproduced with a turntable speed of 78 R. P. M. and so-called "long playing" record discs intended to be reproduced with turntable speeds of 45 R. P. M. and less, and this gives rise to the need for the use of tracking styli of different forms if the best possible reproduction is to be obtained from the several types of record.

It is a common practice therefore to make use of a pick-up or reproducer having a plurality of stylus holders, usually two, which are movable at the will of the operator, relative to the pick-up carrier to bring the required one of the said stylus holders, and therefore the stylus carried thereby, into the position for co-operative engagement of that stylus with the record, the other stylus holder being caused to take a position in which the stylus carried thereby is incapable of engaging the surface of a record on the turntable. In some cases for example a so-called "turn over" pick-up is employed, such a pick-up comprising a pick-up body mounted for rotation through 180° about a general horizontal axis at the end of a pick-up carrying arm and two stylus holders mounted on the pick-up body 180° apart and on opposite sides of and usually symmetrically with reference to the axis of rotation of the pick-up on the pick-up carrying arm.

It is an object of the present invention to provide an apparatus with which an adjustment of the change speed mechanism after termination of reproduction of one record, to achieve a different turntable speed appropriate for reproduction of a next succeeding record requiring a different stylus, is followed automatically by an adjustment of the stylus holders relative to the pick-up carrying arm to bring the appropriate stylus into position for subsequent co-operative reproducing engagement with said next succeeding record.

In accordance with the invention sound reproducing apparatus is provided comprising a turntable for receiving and rotating the disc records, change speed driving means adapted to drive said turntable at any one of a number of pre-determined different speeds, a pick-up having a number of alternative stylus holders, a carrier for said pick-up movable to permit the pick-up to traverse a record on the turntable and to take a position outside the edge of any record on the turntable, a speed change control for the said change speed driving means and movable abutment means adjustable into predetermined alternative set positions by operation of said change speed control and adapted in at least two of said set positions to engage the pick-up whilst the pick-up is out of engagement from any record, in such manner as to effect substitution of one stylus holder for the other in the operative reproducing position relative to the carrier for said pick-up.

The invention is of particular utility when used in conjunction with known forms of sound reproducing apparatus capable of reproducing a series of disc records automatically in succession and in which, before operation of the machine commences, the pick-up is retained in a position in which the pick-up and its carrier lie outside the edge of the turntable.

In many sound reproducing apparatus of this kind the records to be reproduced are fed to the playing position singly in succession by downward movement from the lower end of a stack, along a central spindle above the turntable and when the apparatus is started into operation the pick-up and its carrier first make an outward movement of fixed extent from the retained position before being swung inwards to the position for engagement of the stylus with the record which has been fed on to the turntable.

In such a case the movable abtument means of the present invention is located so as to be capable of being engaged by the pick-up when the pick-up moves into the outermost position.

Thus if the series of records to be played consists of records requiring a different speed from that of records previously played and a different reproducing stylus, the simple manipulation involved in effecting a change in turntable speed also takes effect through setting of the abutment member to effect the change required in the selection of the appropriate stylus.

The invention is also well adapted for use with sound reproducing apparatus for single records in which the movements of the pick-up as a preliminary to starting reproduction of a record are effected by hand. In such case the pick-up and its carrier arm are thrust by hand into a limiting outermost position against the abutment means before being moved inwards to engage the stylus with the starting groove of the next record. Given that the speed control has been set to give the correct turntable speed for the kind of record about to be played, the correct stylus selection for that record will follow automatically.

The invention is illustrated by way of example in the accompanying drawings as applied to a sound reproducing apparatus of the kind capable of reproducing a series of disc records automaticaly in succession and embodying a turn-over pick-up.

In the drawings,

Fig. 1 is a general perspective view of the complete sound reproducing apparatus.

Fig. 2 is a view in part sectional side elevation of a known form of speed change mechanism forming the subject of the earlier U. S. A. Patent No. 2,621,527.

Figs. 10 and 11 are views similar to Figs. 5 and 6 but showing the pick-up turn-over means in its alternative position.

Figure 1:
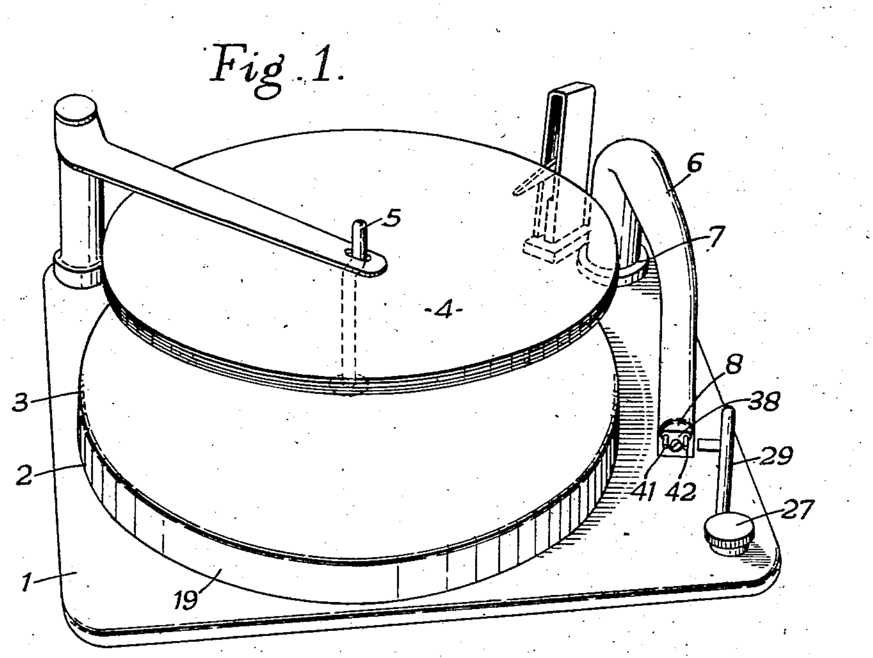
Figure 2:
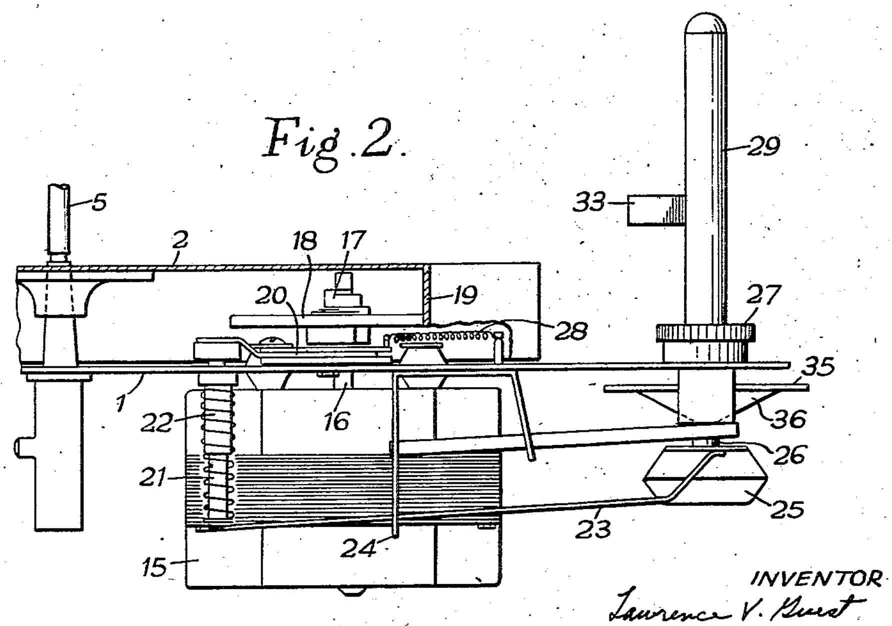
Figures 3, 5, 6:
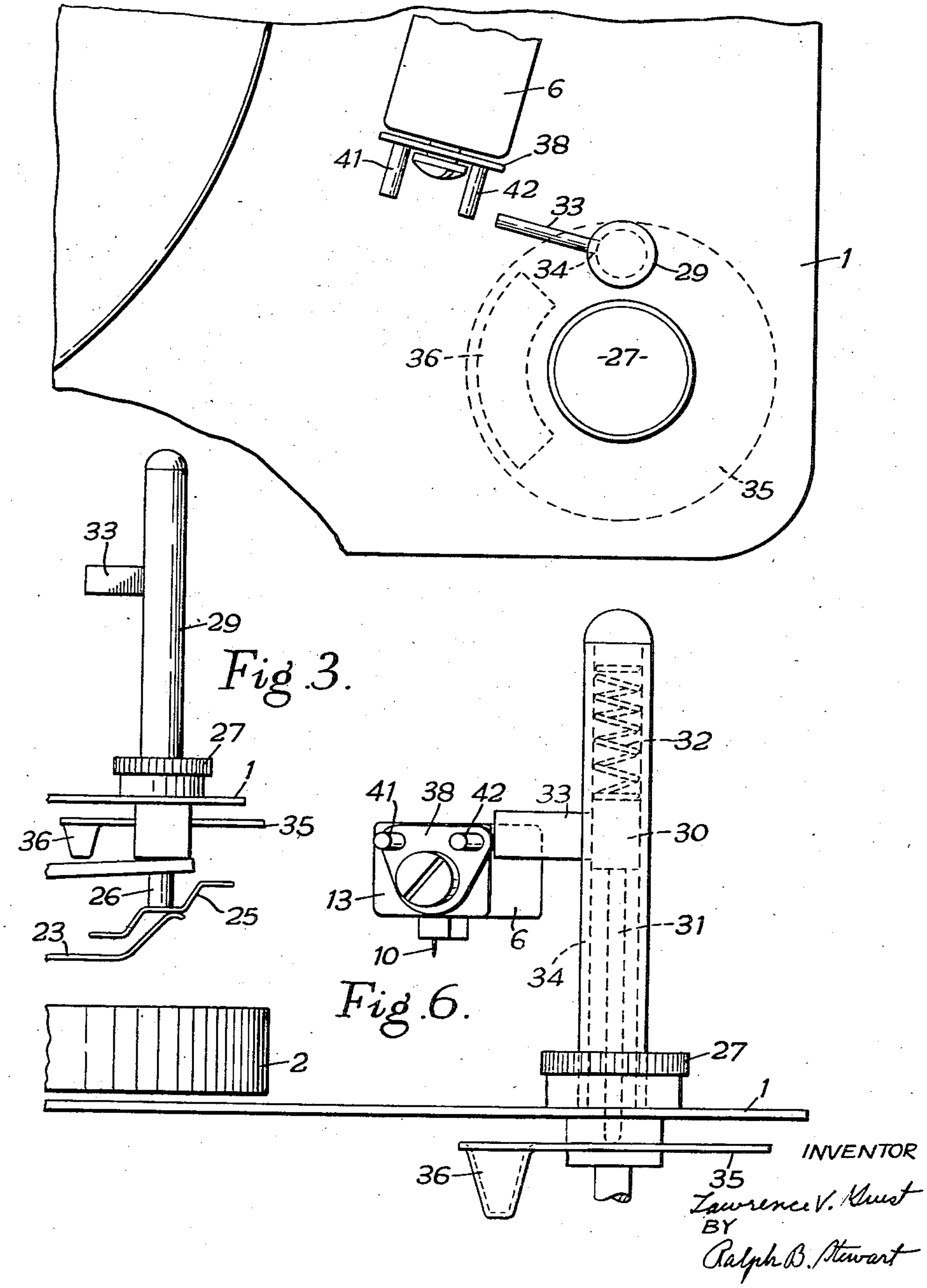
Fig. 3 shows a part of the control for the speed change mechanism in an alternative position.
Figs. 5 and 6 are views in plan and elevation respectively showing one position of the pick-up relative to the pick-up carrier or arm and one position of the means for turning the pick-up over.

Referring to the drawings Figs. 1 to 3, the sound reproducing apparatus there shown comprises a motor board 1, a turntable 2 mounted for rotation above the motor board 1 and adapted to receive disc records 3 fed singly in succession in well known manner from the lower end of a stack 4 suspended upon a spindle 5 extending upwards from the centre of the turntable 2, and a carrier arm 6 mounted in bearings 7 on the motor board 1 for swinging movement transversely of a disc record on the turntable 2 and carrying a pick-up 8 at its free end.

Figures 7, 8, 9:
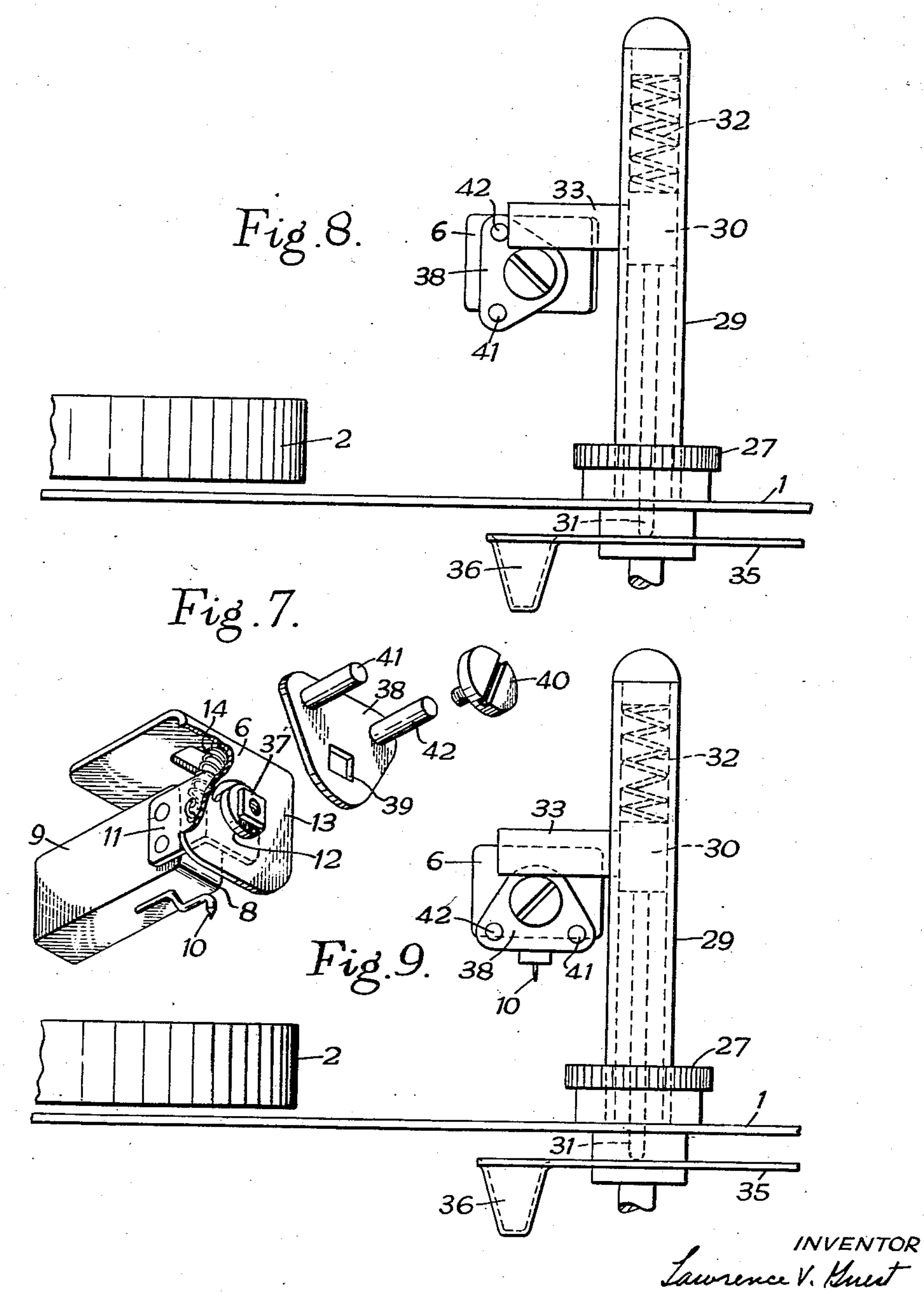
Fig. 7 is a perspective view showing one form of turn-over pick-up.
Figs. 8 and 9 are views similar to Fig. 6, the pick-up being shown in course of being turned over in Fig. 8 and shown fully turned in Fig. 9.
Figure 10:
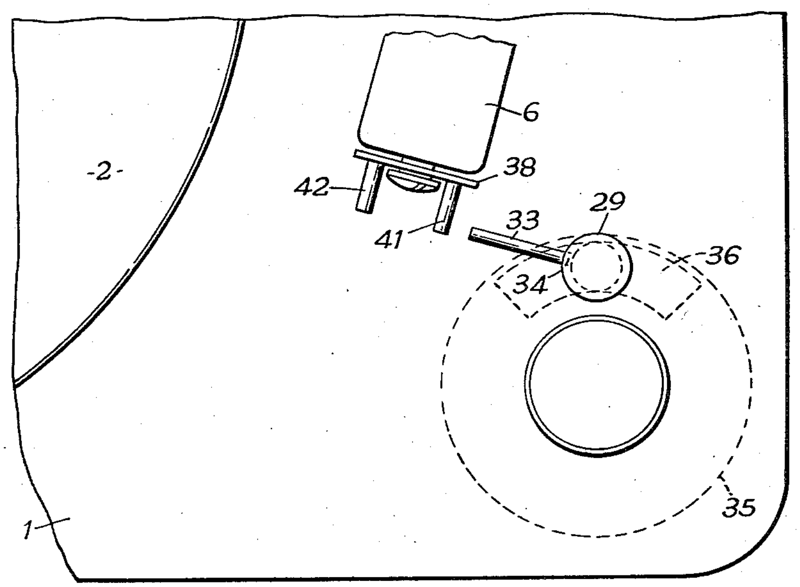
Figure 10:
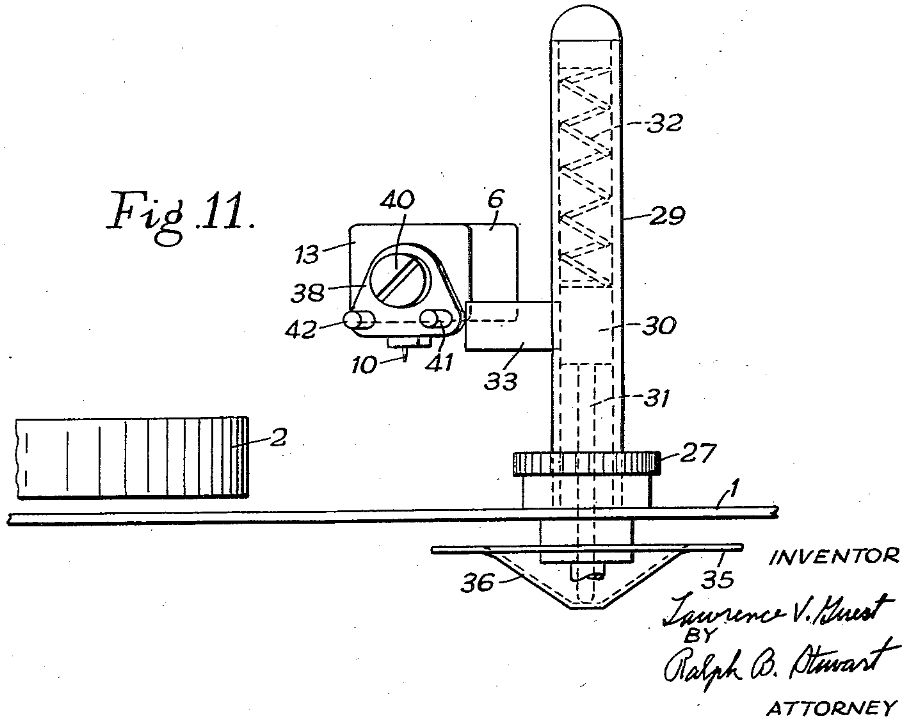

The pick-up 8 is of the known turn-over type comprising a transducer cartridge 9 (Fig. 7) provided with two alternative forms of styli 10 on opposite sides thereof of which one only appears in Fig. 7, the transducer cartridge 9 being fixedly connected with a right-angled plate 11 having an axial pin 37 mounted for rotation in a bearing 12 in a downward extension 13 at the free end of the carrier arm 6 so that either one of the two styli 10 may be brought into the operative position shown in Fig. 7.

A snap-over spring 14 is connected between the plate 11 and a fixed anchorage on the carrier 6 whereby the cartridge 9, when turned over, is caused to move with snap action to opposite sides of a "dead centre" and into either one of its two extreme positions relative to the carrier arm 6 against stops (not shown).

The turntable 2 is required to be rotated at any one of two or more different speeds according to the nature of the disc records to be played and the turntable driving means for this purpose may be of the kind fully described in the earlier U. S. A. Patent No. 2,621,527 and comprising a constant speed electric motor 15 (Fig. 2) secured to the underside of the motor board 1 with its driving spindle 16 extending upwards through the motor board 1 and carrying a stepped pulley 17 at its upper end, and an idler friction wheel 18 (Figs. 2 and 4) arranged to engage betwen the pulley 17 and the inner surface of the rim 19 of the turntable 2 to rotate the latter.

For the purpose of varying the speed of the turntable 2, the idler wheel 18 is movable parallel to itself so as to engage alternative parts of the stepped pulley 17 of different diameter on the constant speed spindle 16.

To this end the idler wheel 18 is carried in a floating bearing in a horizontal carrier plate 20 fixed at the upper end of post 21 mounted for rising and falling movement in a guide sleeve 22 under the control of a lever 23 movable about a fulcrum 24 and one end of which is engaged below the lower end of the post 21.

Movements are imparted to the lever 23 by means of a cam 25 on a vertical spindle 26 rotatable into three predetermined alternative set positions by means of a knob 27 fixed on the spindle 26 and accessible from above the motor board 1.

A tension spring 28 is provided between the floating bearing of the idler wheel 18 on the carrier 20 and a fixed anchorage, to urge the idler wheel 18 into the gap between the stepped pulley 17 on the motor spindle 16 and the rim 19 of the turntable 2 irrespective of the part of the stepped pulley 17 engaged by the idler wheel 18.

In the construction shown, a three-diameter pulley 17 and a three-position control knob 27 are provided giving three turntable speeds of 78 R. P. M., 45 R. P. M. and 33⅓ R. P. M.

In accordance with the present invention means are provided for effecting a turn-over movement of the pick-up cartridge 9 in its bearing 11 on the carrier arm 6 upon a first outward swinging movement of the carrier arm 6 after the speed control knob 27 has been set to effect a speed change from 78 R. P. M. to either 45 R. P. M. or 33⅓ R. P. M. or from either 45 R. P. M. or 33⅓ R. P. M. to 78 R. P. M., it being understood that one form of stylus may be used for two kinds of records playable at 45 and 33⅓ R. P. M.

On the motor board 1 in the region of the speed control knob 27 is fixedly mounted a hollow pillar 29 closed at its upper end and containing a sliding and guided plunger 30 connected with a pin 31 extending downwards through the motor board 1.

The plunger 30 is urged downwards in the pillar 29 by a compression spring 32 and to the plunger 30 is rigidly connected an arm 33 projecting through and guided vertically by a slot 34 in the pillar 29.

On the spindle 26 carrying the speed control knob 27 is fixedly mounted a cam disc 35 of a size to make continuous engagement beneath the lower end of the pin 31 connected with the plunger 30.

The cam disc 35 is formed with a depression 36 in a position enabling the pin 31, plunger 30 and arm 33 to take a predetermined fixed lower position as shown in Fig. 11, for one setting of the speed control knob 27, i. e. the setting corresponding to 78 R. P. M. as used for so-called standard records.

In the other two set positions of the speed control knob 27 corresponding to turntable speeds of 45 R. P. M. and 33⅓ R. P. M. as used for so-called long playing records, the pin 31 rests with its lower end upon the flat portion of the cam disc 35, so that the plunger 30 and the arm 33 are held in a predetermined fixed higher position as shown in Fig. 6.

On the free end of the axial pin 37 of the transducer cartridge 9 (Fig. 7), outside the downward extension 13 of the carrier arm 6 is fixed a plate 38, e. g. by the application of a square hole 39 in the plate 38 over a squared end of the axial pin 37 and fixing by means of a screw 40, see Fig. 7.

On the plate 38 are mounted a pair of spaced parallel horizontally projecting pins 41, 42 symmetrically disposed with reference to the axial pin 37 of the transducer cartridge 9 and arranged to lie in a horizontal plane above the axis of rotation of the transducer cartridge 9 as shown in Fig. 6 or in a horizontal plane below the said axis as shown in Fig. 9, according to that one of the two extreme positions occupied by the transducer cartridge 9 about its axis of rotation on the carrier arm 6, and these two horizontal planes intersect the arm 33 according as the above described vertically adjustable plunger 30 is in its respective higher or lower position.

The operation is as follows:

Assuming that the speed control knob 27 is set for the fast or normal turntable speed of 78 R. P. M., the pin 31 beneath the plunger 30 is engaged in the depression 36 in the cam disc 35 so that the plunger 30 and the arm 33 occupy the lower position shown in Fig. 11, and in these circumstances with the correct stylus 10 in operative position the pins 41, 42 lie in the horizontal plane above the axis of rotation of the transducer head 9 on the carrier arm, and during an outward swinging movement of the carrier arm 6 with the pick-up maintained in the raised position in the manner usual during such swinging movement, as a preliminary to commencement of playing of another record requiring the same turntable speed of 78 R. P. M., the pin 42 on the plate 38 makes no contact with the arm 33 and the transducer cartridge 9 remains unmoved relative to the carrier arm 6.

If however long playing records requiring a turntable speed of 45 or 33⅓ R. P. M. are now to be played and the speed control is re-set accordingly, the cam disc 35 takes a position in which the pin 31, plunger 30 and the arm 33 are in the higher position shown in Fig. 6. As a consequence as the pick-up carrier arm 6 is next swung outwards as a preliminary to reproduction of the next record, the pin 42 (Fig. 6) makes engagement with the end of the arm 33 so that the transducer cartridge is rotated in its bearing 12 on the carrier arm 6 in the manner shown in Fig. 8, until the snap-over spring 14 takes charge to cause the transducer cartridge to take the other extreme position about its pivot as shown in Fig. 9 in which the other stylus 10, appropriate for use with a long playing record, is in the operative position.

During subsequent outward swinging movements of the pick-up carrier arm 6 between reproductions of records requiring the same stylus the transducer cartridge 9 remains unmoved relative to the carrier arm 6, the pin 41 on the plate 38 passing beneath the arm 33 during such swinging.

When playing of normal speed records i. e. records requiring 78 R. P. M., is to be resumed, the speed control knob 27 is re-set to the 78 R. P. M. position to give the required turntable speed and the cam disc 35 takes the position in which the lower end of the pin 31 enters the recess 36.

Thus the arm 33 takes its lower position as shown in Fig. 11 and during the next outward swinging movement of the carrier arm 6 the pin 41 on the plate 38 meets the end of the arm 33 so that the plate 38 together with the transducer cartridge 9 are rotated in the bearing 12 on the carrier arm 6 until the spring 14 again takes charge to complete the turning-over movement of the transducer cartridge 9 to bring that stylus 10 into the operative position which is appropriate for a normal 78 R. P. M. record.

In the case of an apparatus for playnig a succession of records automatically the outward swinging movements of the carrier arm 6 and the pick-up always take place in the same plane corresponding to that of the usual raised condition of the pick-up so that contact when required between the pin 41 or 42 and the arm 33 in the lower or higher position of the latter takes place with certainty.

Figure 4:
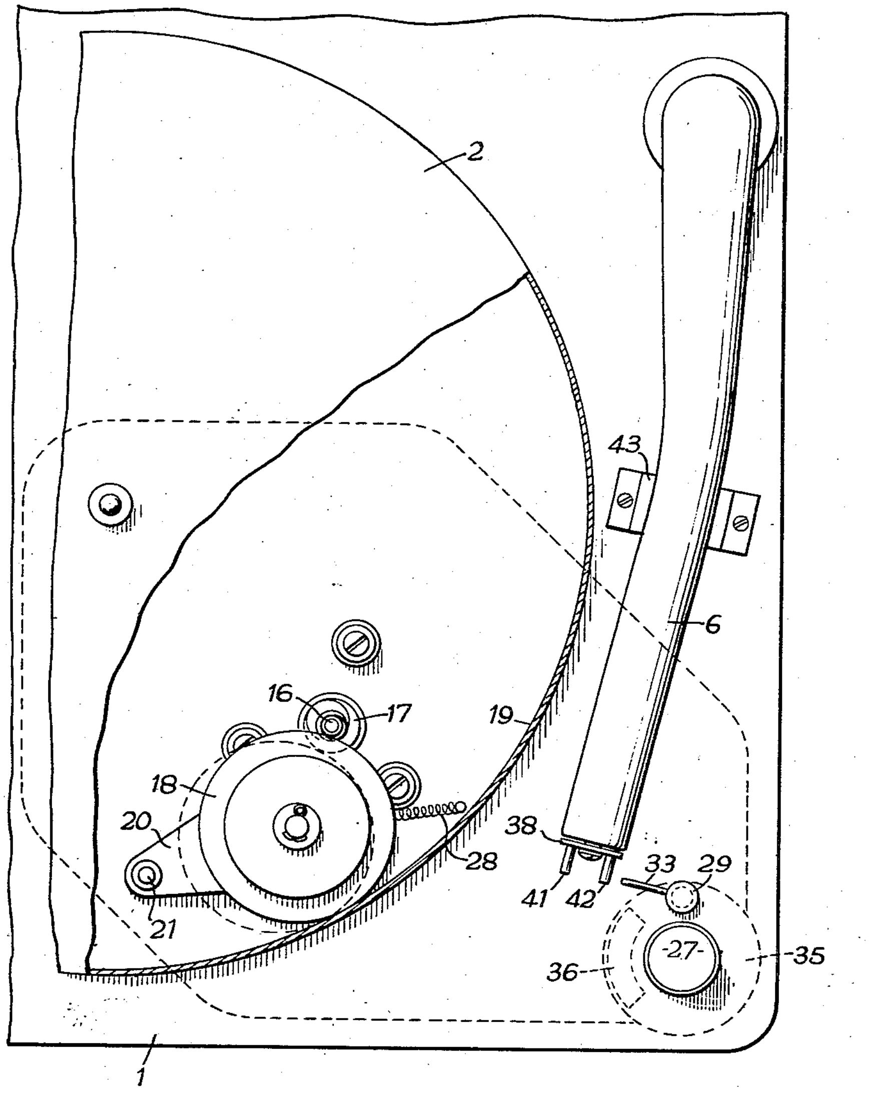
Fig. 4 is a part sectional plan view of a part of a sound reproducing apparatus embodying the invention, the pick-up arm shown being intended for hand manipulation.

In the case of a machine such as shown in Fig. 4 in which the swinging movements of the carrier arm 6 are effected by hand, it is usual for the free or pick-up carrying end of the carrier arm 6 to be capable of some up and down movement to permit the stylus to be lifted from and lowered into engagement with the record.

In such case means such as a fixed block 43 having an inclined upper surface is provided for engagement by the underside of the carrier arm 6 as it approaches its outermost position, to ensure movement of the pins 41, 42 in appropriate planes ensuring engagement of said pins with the arm 33 when the transducer cartridge 9 is to be turned over or passage of said pins over or under the arm 33 when no turn over of the transducer cartridge 9 is required to be effected.

In an alternative arrangement for use with automatic record changers, instead of effecting turnover of the transducer head by means of a spring, means may be provided operated by the automatic mechanism of the apparatus to impart movement to the arm 33 or its equivalent when in either of the set positions determined by the change speed control and at an appropriate time during the cycle of automatic operations, such movement being utilised to effect turning of the transducer head.

I claim:

1. Sound reproducing apparatus comprising a turntable for receiving and rotating the disc records, change speed driving means adapted to drive said turntable at any one of a number of predetermined different speeds, a pick-up having a number of alternative stylus holders, a carrier for said pick-up movable to permit the pick-up to traverse a record on the turntable and to move to an outer position outside the edge of any record on the turntable, a speed change control for the said change speed driving means, and movable abutment means located adjacent the outer position of said carrier and being adjustable into predetermined alternative set positions by operation of said change speed control, and contact means carried by said pick-up in a position to engage said abutment means and being operable by the outward movement of said carrier after engagement with said abutment to effect substitution of one stylus holder for the other in the operative reproducing position relative to the carrier for said pick-up.

2. Sound reproducing apparatus as claimed in claim 1 wherein said pick-up is provided with two stylus holders movable about a fixed axis on the pick-up carrier between two extreme positions in which alternative stylus holders are in the operative position respectively, said abutment means being movable between upper and lower positions relative to the motor board in response to setting movements of the change speed control means, and said contact means comprising a pair of contact members movable into alternative positions in conjunction with the movable stylus holders and arranged to make contact, and to be moved by engagement with said abutment means during an outward swinging movement of the pick-up carrier following a change of position of said abutment means by the operation of the change speed control.

3. Sound reproducing apparatus as claimed in claim 2 wherein the pick-up comprises a transducer cartridge rotatable about a fixed axis on the pick-up carrier arm and the contacting means are formed by elements rigid with the transducer cartridge and projecting axially thereof and arranged, in the two alternative positions of the transducer cartridge about its axis, to lie in either one of two vertically spaced planes capable of intersecting the abutment means according as the latter are in their higher or lower set position.

4. Sound reproducing apparatus as claimed in claim 1 wherein the pick-up is capable of up and down movement during outward swinging movement of the pick-up carrier, and including guide means for engagement by the pick-up carrier during the last stage of an outward swinging movement thereof to fix the plane of swinging movement of the pick-up during such last stage in relation to the abutment means.

5. In sound reproducing apparatus having a turntable and speed-changing means for changing the rotational speed of the turntable between a higher value for the playing of standard records and a lower value for the playing of other records, and in which a pick-up carrier is movable over the turntable for the playing of records and is movable to an outer position outside the edge of any record on the turntable, and including pick-up means carried by said carrier and being provided with two stylus holders movable alternately into operative position with respect to a record on the turntable, the combination of movable abutment means arranged adjacent the outer position of said carrier and being movable from one position to another by operation of said speed-changing means, and contact means carried by said carrier for engaging said abutment and being rendered operative by the outward movement of said carrier into said outer position for shifting said pick-up means to effect movement of the correct stylus holder into operative position with respect to the turntable.

6. In sound reproducing apparatus having a turntable and a pick-up carrier movable over the turntable for the playing of records and being movable to an outer position outside the edge of any record on the turntable, and including pick-up means carried by said carrier and being provided with two styli movable alternately into operative position with respect to a record on the turntable, the combination of a movable abutment arranged adjacent the outer position of said carrier and being movable manually from one position to another, and contact means carried by said pick-up for engaging said abutment and being rendered operative by the outward movement of said carrier into said outer position for shifting said pick-up means to effect substitution of one stylus for the other in the operative position with respect to the turntable.

References Cited in the file of this patent

UNITED STATES PATENTS

| | | |
|---|---|---|
| 2,113,401 | Goldsmith | Apr. 5, 1938 |
| 2,526,188 | Andres | Oct. 17, 1950 |
| 2,608,411 | Fisher | Aug. 26, 1952 |
| 2,689,734 | Wennerbo et al. | Sept. 21, 1954 |